R. W. MUNK.
STAMPING MACHINE.
APPLICATION FILED NOV. 13, 1907. RENEWED MAY 3, 1909.

944,742.

Patented Dec. 28, 1909.
6 SHEETS—SHEET 3.

Fig. 3.

Witnesses
G. M. Spring.
Edgar M. Kitchin

Inventor
Robert W. Munk
By Mason Fenwick & Lawrence.
Attorneys

R. W. MUNK.
STAMPING MACHINE.
APPLICATION FILED NOV. 13, 1907. RENEWED MAY 3, 1909.

944,742.

Patented Dec. 28, 1909.
6 SHEETS—SHEET 4.

Witnesses
G. M. Spring
Edgar M. Kitchin

Inventor
Robert W. Munk.
By Mason Fenwick & Lawrence.
Attorneys

R. W. MUNK.
STAMPING MACHINE.
APPLICATION FILED NOV. 13, 1907. RENEWED MAY 3, 1909.

944,742.

Patented Dec. 28, 1909.
6 SHEETS—SHEET 5.

Witnesses
G. M. Spring
Edgar M. Kitchin

Inventor
Robert W. Munk
By Mason Fenwick & Lawrence
Attorneys

R. W. MUNK.
STAMPING MACHINE.
APPLICATION FILED NOV. 13, 1907. RENEWED MAY 3, 1909.

944,742.

Patented Dec. 28, 1909.

UNITED STATES PATENT OFFICE.

ROBERT W. MUNK, OF ATLANTA, GEORGIA, ASSIGNOR OF ONE-THIRD TO J. L. DE GIVE AND ONE-THIRD TO J. T. THOMASON, OF ATLANTA, GEORGIA.

STAMPING-MACHINE.

944,742.  Specification of Letters Patent.  Patented Dec. 28, 1909.

Application filed November 13, 1907, Serial No. 402,031. Renewed May 3, 1909. Serial No. 493,713.

*To all whom it may concern:*

Be it known that I, ROBERT W. MUNK, a citizen of the United States, residing at Atlanta, in the county of Fulton and State of Georgia, have invented certain new and useful Improvements in Stamping-Machines; and I do hereby declare the following to be a full, clear, and exact description of the invention, such as will enable others skilled in the art to which it appertains to make and use the same.

This invention relates to improvements in stamping machines, and more particularly to machines especially employed for numbering and lettering laundry.

The generic object in view is the production of a comparatively simple and light machine which is at the same time strong and durable and capable of rapid manipulation.

With this and numerous detail objects in view, the invention comprises certain novel constructions, combinations and arrangements of parts, as will be hereinafter fully described and claimed.

In the accompanying drawings.

Figures 6, 7, 8:
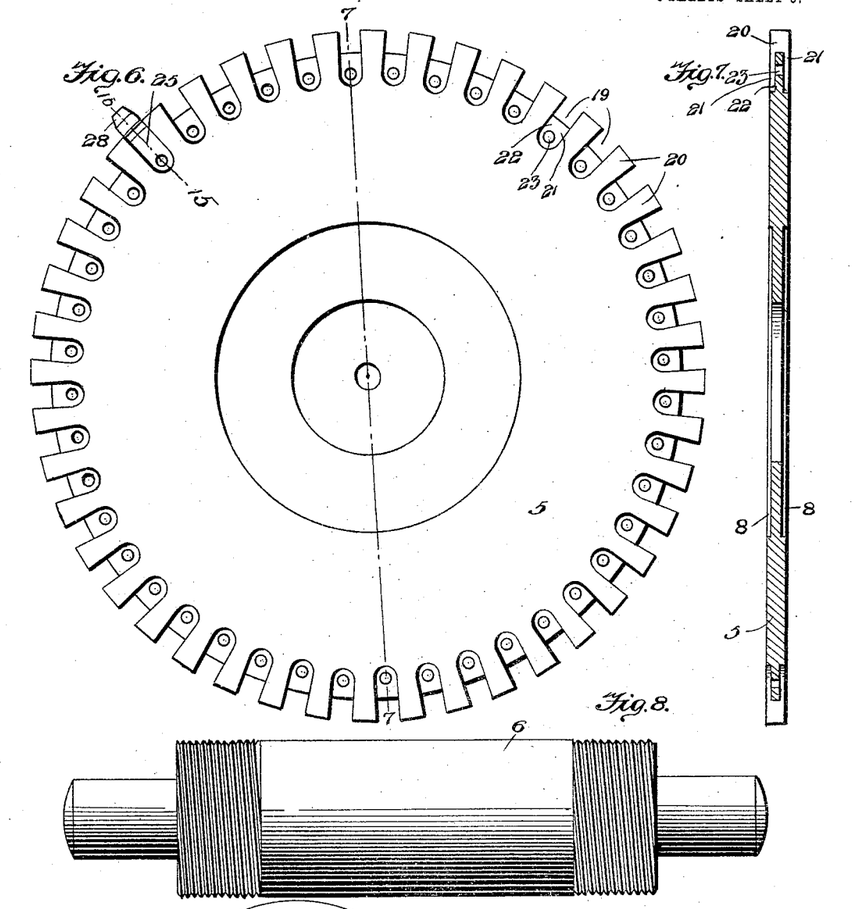
Fig. 6 is a detail view in side elevation of one of the type disks.
Fig. 7 is a vertical section therethrough taken on the plane indicated by line 7, 7 of Fig. 6.
Fig. 8 is an enlarged, detail side elevation of the type disk shaft.
Figure 9:
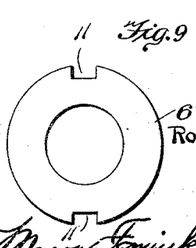
Fig. 9 is an end view thereof.
Figure 10:
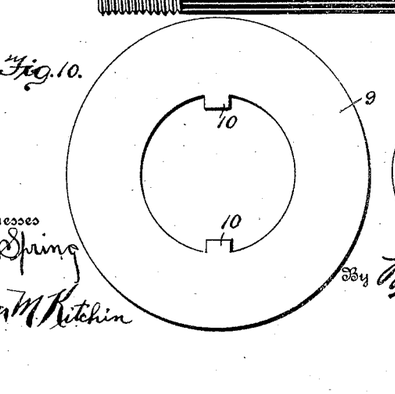
Fig. 10 is a detail, side elevation of one of the friction washers.

Referring to the drawing by numerals, 1 indicates an inclosing housing or casing which covers all parts of the machine which require protection and do not demand to be exposed, and within the casing 1 is arranged a frame-work 2, which extends upwardly and throughout the casing to all points necessary for sustaining parts of the machine, the weight of substantially all of the parts of the machine being sustained by the framing 2. The casing 1 and framing 2 are mounted upon a stand 3 containing the foot lever mechanism as hereinafter described, and the said casing and framing extend upwardly from the stand 3 in the form of a rectangular boxing for receiving the platen actuating mechanism, and is then tapered into a relatively small neck portion and again swells out into an enlargement or head for the reception of the type mechanism, a space 4 being left between the head and the boxing for the introduction of the articles to be stamped, as will be hereinafter specified. Within the head are arranged the type disks 5, 5 which are revolubly mounted on a shaft 6 journaled in bearings 7, 7, formed integral with or suitably fixed to the framing 2. The disks 5 are spaced a sufficient distance apart for preventing frictional contact, and each disk, as seen best in Fig. 7, is provided with an annular recess 8 in each face for accommodating contiguous friction washers 9, 9, which are mounted upon the shaft 6, each of the washers 9 being provided with keys or feathers 10 extending into longitudinal grooves 11 formed in the shaft 6. Any suitable spacing washers 12, 12 are arranged on the shaft 6 between the outermost disk 5 and the respective bearing 7 for insuring a close frictional contact between all of the type disks 5 and the friction washers 9. The shaft 6 extends beyond its bearing at one end and a disk 13 is fixed to the extended end and is provided with an operating handle 14' which, together with the disk, serves as a crank for facilitating manual rotation of the shaft 6. The inner edge of the periphery of the disk 13 is formed with notches 14, a notch 14 being provided for each type of any one of the type disks 5, each of the type disks having the same number and kind of type as any other of the disks.

At one side of the casing 2 is arranged a pointer 15 connected to a reciprocating plunger 16 mounted in a housing 17 formed of a part of the casing 2. The plunger 16 at its outer end, just beneath the pointer 15, is provided with an anti-friction roller 18 which is arranged to ride upon the inner face of the disk 13 near the periphery thereof so as to drop successively into the notches 14, the pointer overhanging the periphery of the disk 13.

Figures 11, 14, 15, 16:
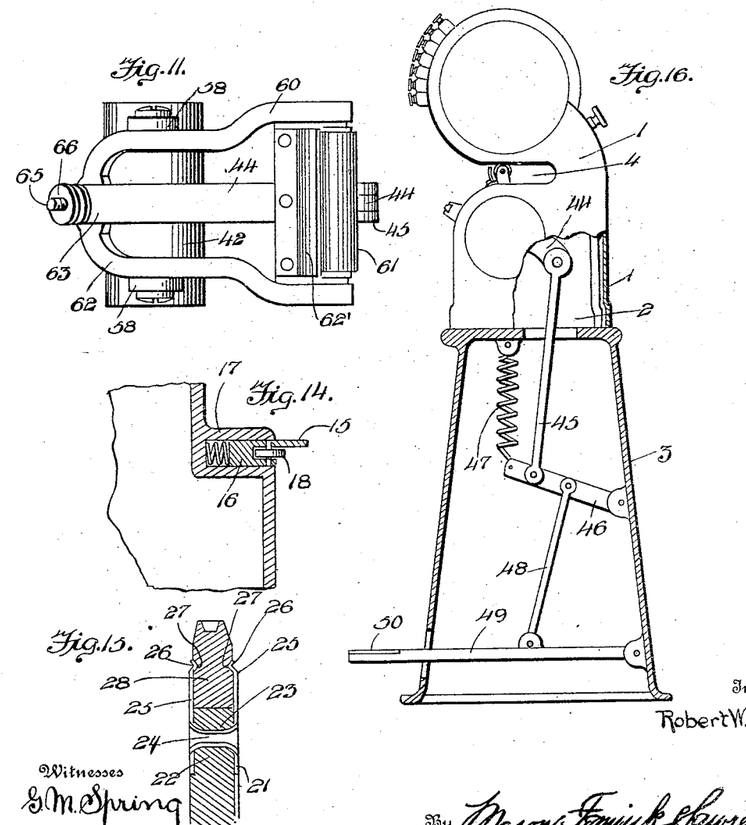
Fig. 11 is a detail, plan view of the inking roll and operating parts.
Fig. 14 is an enlarged, detail, fragmentary view indicating in section the type indicator.
Fig. 15 is an enlarged, detail section of a fragment of one of the type disks and type taken for instance on the plane indicated by line 15, 15 of Fig. 6.
Fig. 16 is a view partly in elevation and partly in section of a complete machine including the stand and foot operated parts.

Each of the disks 5, as will be best understood by reference to Figs. 6, 7 and 15, is provided with radial notches 19, 19 leaving therebetween radial lugs 20, 20. Extending toward the center of the disk from the inner end of each of the notches 19, at both sides of the disk, are recesses 21, leaving an intervening web 22 which is penetrated by an aperture 23 designed to receive a rivet 24, which is preferably of the tubular type, and which engages, at its opposite ends, type retaining spring arms 25, 25, the spring arms 25 fitting snugly within the recesses 21. The arms 25 extend upwardly beyond the web 22, as clearly seen in Fig. 15, and each is provided with an inwardly projecting bead 26 at its outer end adapted to fit within a corresponding groove 27 of a type 28. As the grooves 27 are beveled, the type 28 is adapted to be readily inserted between the spring arms 25 and snapped into place, and as readily removed when desired. The type is of such length as to rest upon the outer edge of the web 22, and the type is of such size as to fit snugly between the two contiguous lugs 20. The type is thus firmly retained in position and maintained in alinement while being susceptible of ready removal. The type 28 extend beyond the lugs 20 leaving a recess therebetween, and, in order to temporarily lock the type disks against revolution, the casing 1 is provided with radial housings 29, 29, one arranged opposite each of the type disks, and each housing containing a plunger or key 30 normally extending between the two contiguous type and in contact with the respective lug 20 therebetween. The plunger 30 is carried by a shank 31 which extends through the outer end of the housing and is provided with a head or cap 32, a spring 33 being interposed between a portion of the housing and the plunger 30 for pressing the plunger toward the disk. Each of the shanks 31 is formed with a longitudinal groove into which extends a pin 34 carried by the respective housing 29 which serves to guide the shank and prevent any twisting movement or displacement of the plunger or key 30 so that it will fit snugly in the recess between the contiguous type.

Figure 1:
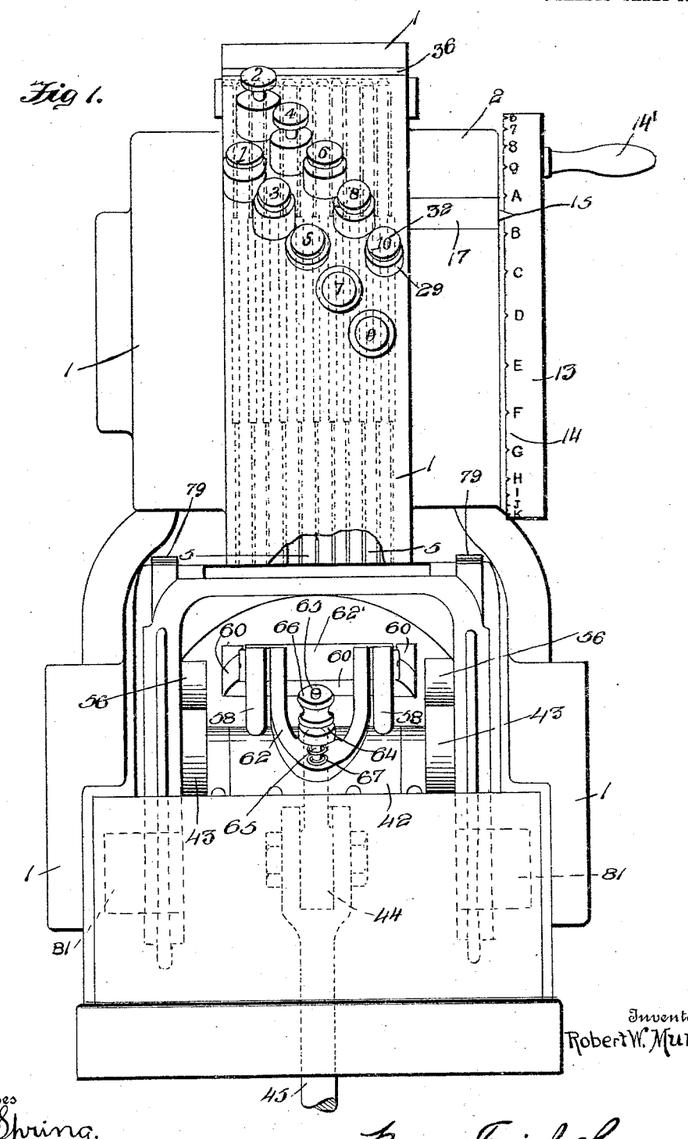
—Figure 1 is a view in front elevation of a machine embodying the features of the present invention.

The casing 1, substantially at the lowest point of the head, is formed with an opening or transverse slot 35 through which the type of the several disks 5 are exposed in transverse alinement for printing purposes. As seen in Fig. 1, the casing 1 is formed with a transverse slot 36 immediately above the housings 29 through which the type of the disks may be viewed. The outer face of each of the lugs 19 is stamped or otherwise suitably provided with a type whose character corresponds with one of the movable type of the disk, the relative position of the corresponding type being such that when a given lug is seen through the slot 36, its corresponding type will be exposed through slot 35 and in position for printing. Thus by revolving any one of the disks 5 until the type desired is exposed through the slot 35 the corresponding configuration or type will at the same time appear through the slot 36 on the lug 20 of the particular disk in question, so that it is only necessary to position a given lug opposite the slot 36 in order to be sure that the required type is exposed in printing position.

In order to bring any one of the disks to a printing position, it is only necessary to pull outwardly upon the respective pin 31 for withdrawing the corresponding flange 30 and then to revolve the disk until the desired lug 20 is seen through the slot 36. It is obvious of course that the friction washers 9 all revolve whenever the shaft 6 is revolved, and therefore any disk 5 will revolve which is at liberty to do so, the friction between the washers 9 and disks 5 being such as to readily transmit movement to the disks, if the disks are free. In order to facilitate ready and accurate alinement of the type of the several disks 5, the disk 13 is provided with characters on its periphery corresponding to the several type of any one of the disks, the type of one disk of course being a duplication of the type of all the other disks, and one of the characters on the disk 13 being provided for each notch 14.

In operation it is found that if the disk 13 is revolved with any great rapidity, the type moves past the slot 36 so rapidly as not to be discernible. Therefore, before releasing the particular plunger 30, when it is desired to set any one of the type disks, the disk 13 is revolved until the particular character of the given disk seen through the slot 36 has its corresponding character on the disk 13 brought opposite the pointer 15. For instance, if the letter "B" should be seen through the slot 36, the operator would simply revolve the disk 13 before touching the nut 32 until the letter "B" on the disk arrives at the pointer 15. It is to be noted that when the letter "B" arrives at the pointer 15, the roller 18 will rest within the notch 14 corresponding to that letter, which materially facilitates the stopping and starting of the disk 13 as desired. As soon as the character on the disk 13 which is opposite the pointer 15 is the same as the character exposed through the slot 36, the disk 13 will be in register with the particular disk 5 and then it is only necessary to elevate the plunger 30 of the particular disk 5 and revolve the disk 13 until the desired character to be printed arrives opposite the pointer 15, whereupon the same character will appear through the slot 36 and consequently a type of the same character will be exposed at the printing point.

A transverse shaft 37 is mounted in the framing 2 and carries suitable brackets 38 on which is mounted the type cleaning brush 39, which by striking the type as the several disks are revolved, maintains the same in a cleaned condition.

Within the boxing portion of the housing and suitably supported on the frame 2 are journal bearings 40 in which is journaled a power shaft 41 to which shaft are fixed a sleeve 42 and cams 43, 43. Projecting rearwardly from the sleeve 42 is a downwardly curved arm 44 which is pivotally engaged by the bifurcated upper end of an operating link 45, the said link extending from any suitable source of power, but by preference, as indicated in Fig. 16, being connected with a lever 46 which is pivoted at one end to a supporting stand 3, and at its opposite end is retained normally in its upper position by a spring 47, the lever 46 in turn being engaged by a link 48 which extends to a foot treadle lever 49 so that the lever 44 may be depressed by depressing the treadle 50 at the outer end of the lever 49. It is to be noted that in the several figures of the drawing, except in Fig. 16, the link 45 is indicated as being depressed, the raised or at rest position being seen in dotted lines in Fig. 2. Outside the cams 43, guiding blocks 51 are loosely mounted on the shaft 41, and said blocks fit snugly in vertical, longitudinal slots 52 formed in depending arms 53 of a yoke or frame 54, the upper horizontal portion of the yoke 54 being provided with a printing platen 55. Above the slots 52, the arms 53 carry rollers 56 which ride upon the peripheries of the respective cams 43. The arms 53 extend below the shaft 41 and are connected by springs 57, 57 with the guiding blocks 51, so that the yoke 54 is forced downwardly for retaining the rollers 56 at all times in contact with the cams 43 and for insuring a return movement of the yoke after the same has been thrust upwardly by the cams 43. Projecting radially upwardly from the sleeve 42 are arms or lugs 58, 58, to the outer ends of which is pivoted a frame 60 for an inking roller 61. For preventing contact of the roller 61 with the article to be printed, a guard 62' is preferably disposed in front of the roller. Extending forwardly from the frame 60 is a yoke 62. An arm 63 extends upwardly from the sleeve 42 through the yoke 62 and is formed with a bent end 64 through which a pin 65 is slidingly passed, said pin being fixed to the outer end of the yoke 62. A thumb nut 66 is threaded onto the outer end of the pin 65 for the purposes of adjustment, and an expansion spring 67 surrounds the pin and is interposed between the yoke 62 and the bent end 64 so that the frame 60 with its inking roll 61 will follow the movement of the arm 44 subject to the pressure of spring 67.

Figures 12, 13:
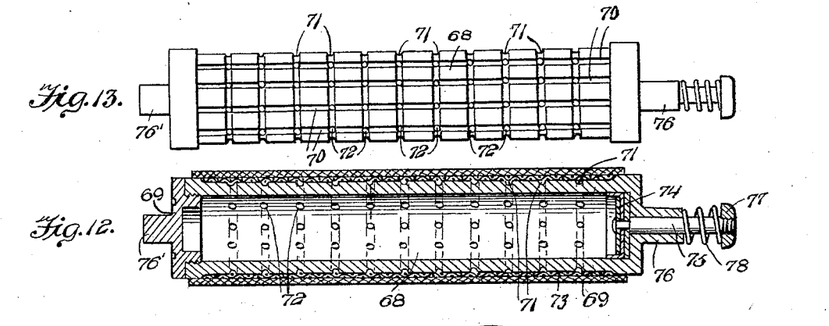
Fig. 12 is an enlarged detail, longitudinal, vertical, central section through the inking roll detached.
Fig. 13 is a view in side elevation of the same with the distributing mesh and blanket removed.

The inking roll 61 is constructed in detail preferably as indicated in Figs. 12 and 13 and consists of a hollow cylinder 68 having one of its ends threaded or otherwise detachably connected, as at 69, for facilitating introducing a charge of ink. The cylinder 68 is provided with longitudinal grooves 70 and intersecting annular grooves 71, and is also provided with apertures 72, 72 leading from the interior and communicating with the grooves 70 and 71, said grooves 70 and 71 being employed for facilitating distribution of the ink. Surrounding the cylinder 68 is a wire mesh cylinder 73 which is covered by a distributing blanket 69 of cotton or other suitable fiber. In the opposite end of the cylinder 68 from the removable cap 69 is arranged a piston or plunger 74 engaged by a piston rod 75 which is passed through the hollow journal 76 of the cylinder. The outer end of the piston 75 is provided with a button or nut 77 and a spring 78 is interposed between said nut and the journal 76, so as to normally maintain the piston rod and piston in their outermost position. In operation, the indelible ink which must be employed sometimes, even with the precautions embodied in the structure just described, does not remain sufficiently moist, whereupon the operator will simply press inwardly upon the button or nut 77 and then release the same, which will thrust the piston 75 inwardly and then cause the said piston to return to its outer position. This will have the effect of first forcing a comparatively large quantity of ink outwardly through the apertures 72 and then draw the same inwardly again. This will thoroughly moisten the blanket 69 and insure the even distribution of ink. The cap 69 is provided with a journal 76′, and the said journals 76 and 76′ are mounted in suitable bearings in the frame 60. By preference, I turn down the intermediate portion of the cylinder 68 as indicated clearly in Figs. 12 and 13, so that the ends of said cylinders have greater diameters than the intermediate portions, so that the wire mesh cylinder may be fitted about the cylinder and be flush with the end portions, and the inner surfaces of the edges of the blanket 69 rest against the end portions of the cylinder. This is, of course, an arbitrary feature of construction and may be varied at will. However, the wire mesh is quite essential for the proper distribution of the ink although I have found that by nurling the cylinder, the capillary action will produce efficient results but not as efficient as may be accomplished by the use of the wire mesh.

Secured to the inner edge of each of the arms 53 of yoke 54 is a spring arm 79 which extends upwardly past the horizontal portion of the yoke 54 so as to clamp articles in place on the platen 55, and retain the same firmly in position during the printing operation.

Pivoted to the casing 1 at the opposite ends of the slot 35 and in the rear thereof are guiding bars 80 which are disposed in the path of movement of the outer end of the frame 60 at the sides thereof, each of the said bars 80 being of a length sufficient, when swung to a horizontal position, to extend across the slot 35 and strike the opposite wall of the casing 1.

Figures 2, 5, 17:
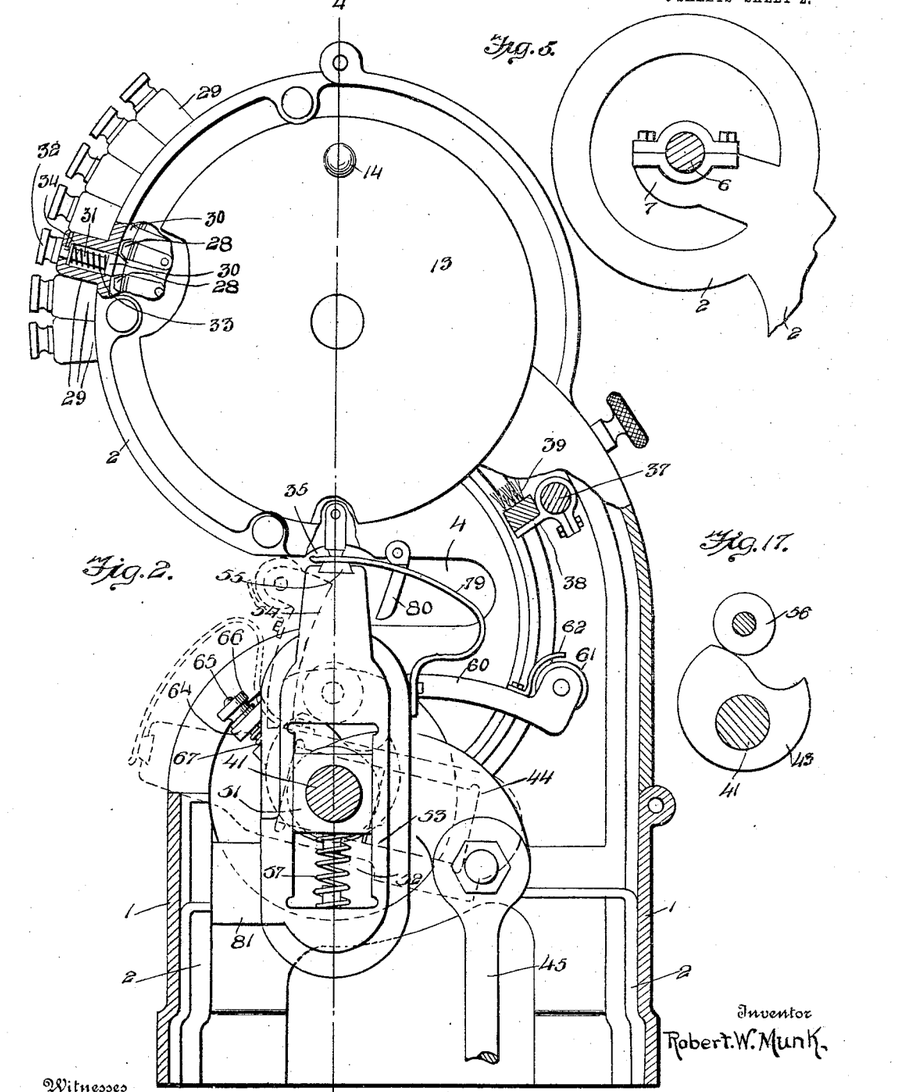
Fig. 2 is a view in side elevation thereof, parts of the casing being broken away and other parts being indicated in section for disclosing interior structure.
Fig. 5 is a detail elevation of a fragment of the frame detached indicating the journal bearing, the journal being seen in section.
Fig. 17 is a detail, vertical section taken on the plane of line 17, 17 of Fig. 4, looking in the direction indicated by the arrow.
Figure 3:
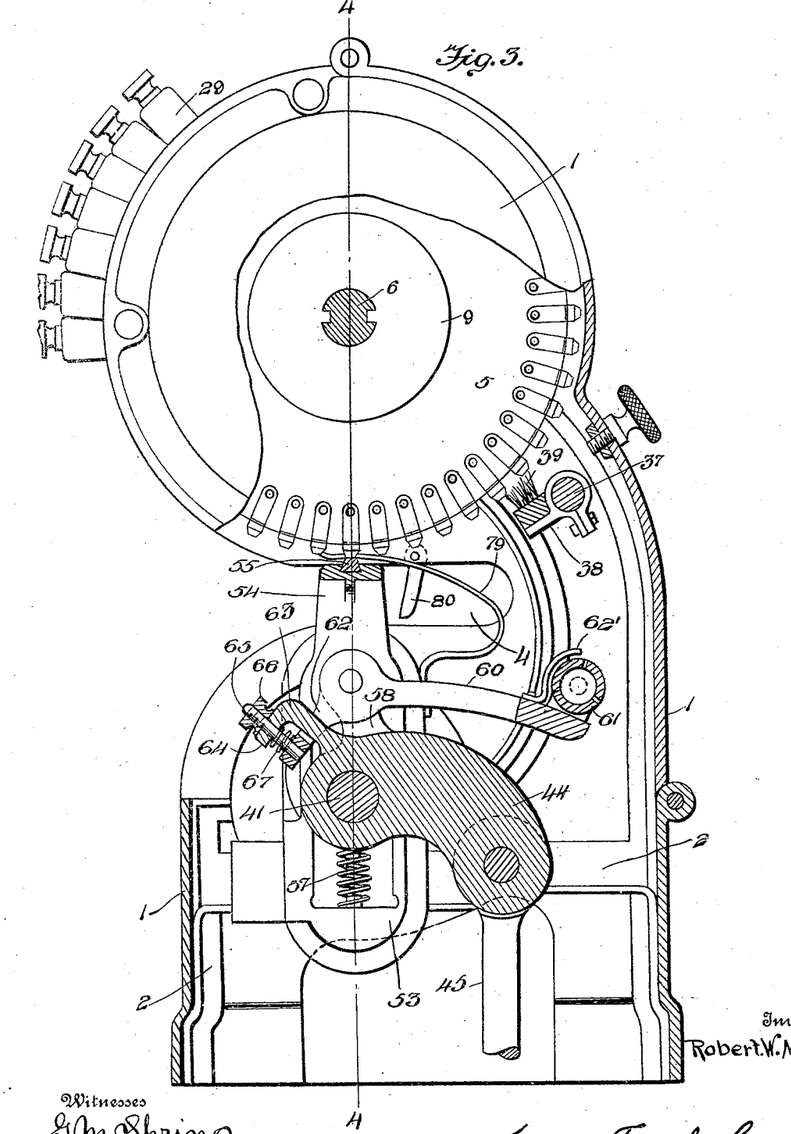
Fig. 3 is a vertical, central section through the lower portion of the machine, the upper portion being shown partly in section and partly in elevation, the section being taken on the plane indicated by line 3, 3 of Fig. 1.
Figure 4:
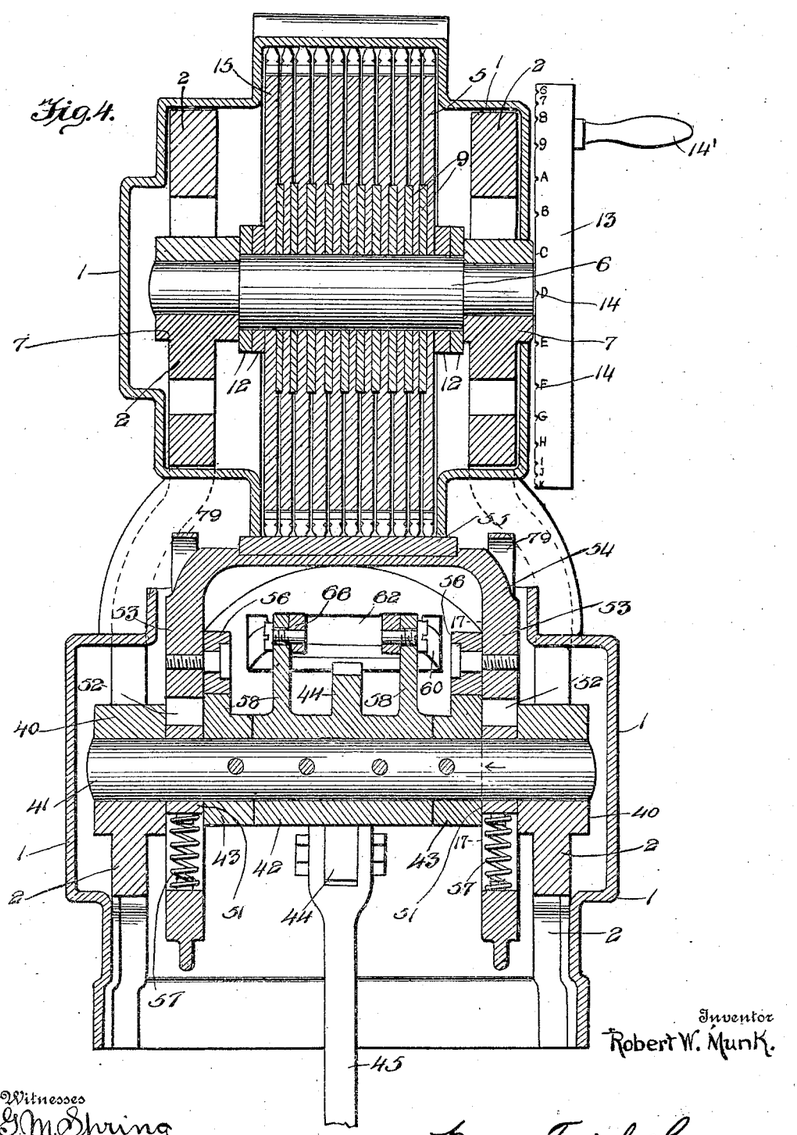
Fig. 4 is a similar section taken at right angles to the plane of the section of Fig. 3, as indicated by line 4, 4 of Figs. 2 and 3, the operating disk being indicated in section.

In operation after the operator has selected the desired type, the parts being in the position indicated in dotted lines in Fig. 2, the garment or other article to be stamped is placed upon the platen 55 and beneath the arms 79. The operator next depresses the lever 49, which draws down the arm 44 and rotates the sleeve 42 and shaft 41. The yoke 54, by reason of the frictional contact of cams 43 with rollers 56, is first swung from an inclined position to a vertical position, whereupon the lower ends of the arms of the yoke strike stops 81 81 carried by the frame 2, and the said yoke is thus disposed with the platen 55 in proper vertical relation to the printing type. The further downward movement of the lever 44 causes the cams 43 to elevate the rollers 56 and correspondingly elevate the yoke 54 until the platen 55 is moved either into contact with or into sufficient proximity to the type for producing a printing operation. As soon as the lever 49 is released the arm 44 will be lifted again by the action of spring 47 and the springs 57 immediately force the yoke 54 downwardly and the further upward movement of the arm 44, by revolving shaft 41, causes the yoke to spring back to its at rest position, as indicated in dotted lines in Fig. 2. Obviously the frictional resistance of the cams 43 against the rollers 56 will be sufficient for swinging the yoke 54 to the vertical position before the yoke begins to rise under the action of the cams against the pressure of the springs 57. It is further to be observed that when the frame 60 strikes the bars 80 the bars will be lifted to a horizontal position and will cause the frame 60 to move back upon its pivotal mounting against the pressure of the spring 67, and thus prevent the roller 61 from striking the printing type, but as the frame 60 continues to move forwardly it will pass beyond the bars, and the said bars will then drop back to the position indicated in Fig. 2, so that as the yoke 54 is lifted for the next operation, the roller 61 will wipe over and deposit ink upon the printing type. Thus no ink is deposited on the type as the yoke returns to its at rest position, and ink is deposited as it moves up for a printing operation, so that no opportunity is permitted for ink to dry on the type and a fresh supply of ink on the type is always assured for each printing operation.

What I claim is:—

1. In a mechanism of the class described, the combination of a printing type, of a platen for presenting the article to be printed to said type, a frame carrying said platen, means for moving said frame, an inking roller frame carried by the first mentioned frame, and an inking roller carried thereby, and a bar mounted so as to depend in the path of movement of the inking roller frame contiguous to the type of sufficient length to extend across the type when brought into alinement therewith for preventing the inking roller from contacting with the type as the same approaches the type.

2. In a mechanism of the class described, the combination with printing type, of a platen therefor, a yoke carrying said platen having depending slotted arms, means to swing the yoke, a revolubly mounted shaft extending through the slots of said arms, guiding means revolubly mounted on the shaft, and fitted in the slots of said arms, cams fixed to the shaft and engaging said yoke for moving the yoke when the shaft is revolving, and means for limiting the swinging movement of the yoke for producing longitudinal movement thereof under the action of the cams.

3. In a mechanism of the class described, the combination with printing type, of a platen movable with respect to the same and adapted to present thereto the article to be printed, a swinging and reciprocating frame carrying said platen, means for swinging and reciprocating the frame for presenting a platen to the type, and means for inking the type connected with said frame operable only upon the approach of the platen toward the type.

4. In a mechanism of the class described, the combination with printing type, of a platen for presenting the article to be printed to said type, a swinging frame carrying said platen, means for swinging the frame, and an inking roller connected with the frame in position for moving past the type, as the platen approaches the same and as the platen recedes from the same, and means for preventing contact of the inking roller with the type as the platen recedes from the type.

5. In a mechanism of the class described, the combination with printing type, of a platen for presenting the article to be printed to said type, a swinging frame carrying said platen, means for swinging said frame, an inking roller frame carried by the first-mentioned frame, an inking roller carried thereby, and a pivoted bar pivoted to depend in the path of movement of the inking roller frame contiguous to the type and of sufficient length to extend across the type when brought into line therewith for preventing the inking roller from contacting with the type as the same approaches the type, the said pivoted bar being of less length than the length of the stroke of the printing roller frame for permitting the printing roller frame to pass the bar after passing the type in one direction of its swing.

6. In a mechanism of the class described, the combination with printing type, a platen for presenting the article thereto, a frame carrying said platen, a rotatably mounted shaft extending through said frame, an arm fixed to the shaft, means for swinging said arm for rotating the shaft, means for transmitting movement from the shaft to the frame for swinging the frame, an arm fixed to said shaft, an inking roller frame pivoted to said last-mentioned arm, spring connections between the printing roller frame and the shaft for causing said frame to swing with the rotation of the shaft relative to the swinging movement of the first-mentioned frame but under spring pressure, and an inking roller carried by the inking roller frame in position for striking the type in one direction of its movement.

7. In a mechanism of the class described, the combination with printing type, and a platen for presenting the articles to be printed thereto, of a frame carrying said platen, a power shaft connected to said frame for swinging the same for moving the platen toward and away from the type, an inking roller frame pivotally carried by the shaft and extending therefrom, spring connections between the shaft and inking roller frame for causing the frame to swing relative to the swinging of the first-mentioned frame when the shaft is rotated, and an inking roller carried by the inking roller frame in position for engaging the type during the swinging of said frame.

8. In a mechanism of the class described, the combination with printing type, of a platen therefor, of a frame carrying said platen, a power shaft connected with the frame for swinging the frame when the same is rotated, an inking roller frame pivotally connected to said shaft, a yoke extending forwardly from said inking roller frame, an arm fixed to the shaft and extending through said yoke, and having a bent portion extending above the yoke, a pin fixed to the yoke and slidably projecting through said bent portion of said arm, an expansion spring interposed between the said bent portion and said yoke, a thumb nut threaded on the free end of said pin, and an inking roller carried by said inking roller frame in position for contacting with said type during the swinging movement of the frame when the shaft is rotated.

In testimony whereof I affix my signature in presence of two witnesses.

ROBERT W. MUNK.

Witnesses:
ROBERT L. SWINNEY,
C. S. MIERS.